United States Patent
Audehm et al.

[11] Patent Number: 5,322,444
[45] Date of Patent: Jun. 21, 1994

[54] DEVICE FOR THE ELECTRICAL CONNECTION OF PARALLEL BUSBARS

[75] Inventors: Karsten Audehm, Winsen/Luhe; Eckhard Ammann, Seelscheid, both of Fed. Rep. of Germany

[73] Assignee: Klöckner-Moeller GmbH, Bonn, Fed. Rep. of Germany

[21] Appl. No.: 999,028

[22] Filed: Dec. 31, 1992

[51] Int. Cl.⁵ ............................................. H01R 4/70
[52] U.S. Cl. ........................................ 439/210; 439/215
[58] Field of Search ............... 439/115, 209–216; 174/68.2, 48, 71 B, 70 B, 72 B, 72 C, 88 R, 88 B, 88 S

[56] References Cited

U.S. PATENT DOCUMENTS

| | | | |
|---|---|---|---|
| 3,004,097 | 10/1961 | Johnston et al. | 174/88 |
| 3,459,872 | 8/1969 | Weimer et al. | 174/71 |
| 3,459,874 | 8/1969 | Fouse et al. | 174/86 |
| 4,627,680 | 12/1986 | Weimer | 439/210 |

FOREIGN PATENT DOCUMENTS

| | | |
|---|---|---|
| 1255761 | 12/1967 | Fed. Rep. of Germany. |
| 2743424 | 3/1979 | Fed. Rep. of Germany. |
| 2628267 | 9/1989 | Fed. Rep. of Germany. |

*Primary Examiner*—Eugene F. Desmond
*Attorney, Agent, or Firm*—Nils H. Ljungman & Associates

[57] ABSTRACT

The known arrangements of low-voltage energy distribution include connecting elements for busbar trunking systems with which, while a change of direction is possible, the currents are limited. The new device is intended to make it possible to easily change directions, even with high currents. To achieve this object, the invention teaches that the busbars at the junction site are placed in such a way around a common tensioning element that they can be rotated.

8 Claims, 7 Drawing Sheets

DEVICE FOR THE ELECTRICAL CONNECTION OF PARALLEL BUSBARS

BACKGROUND OF THE INVENTION

1. Field of the Invention

The invention generally relates to a device for the electrical connection of two parallel busbars for busbar trunking systems with a common tensioning element in the form of a bolt. In the device, the busbars are arranged at the junction site in such a way that they rotate around the common tensioning element.

2. Background Information

When using busbar trunking systems, a problem often occurs wherein, because of structural conditions, the trunking systems must be equipped with flexible connecting elements, such as in situations when the busbars must be run along a wall which goes around a corner.

Connecting elements for busbars with flexible connecting leads are known, whereby a jacketing is ribbed to create the sense of optical continuation of the contours. Such a device is described and illustrated in German Laid Open Patent Appln. No. DE-OS 27 43 424. However, the device disclosed therein tends to be unsuitable for high currents, particularly for several hundred, or even thousands, of Amperes. A further disadvantage is that the connecting elements must usually be supported at the end sections.

An additional connecting element for the connection of two distributor channels, with which changes of direction can be effected, and which consists of a flexible jacket tube in which insulated cables are run, is described and illustrated in German Patent Publication Published for Opposition Purposes No. DE-AS 1255761. However, this device also tends to be unsuitable for high currents.

An additional connecting element consisting of a jacket tube comprised of chain links, in which tube the flexible leads are contained and whereby the chain links can be rotated in opposite directions around an axis, is described and illustrated in French Laid Open Patent Application No. 89 03 170. However, this connection element tends not to be suitable for higher currents.

U.S. Pat. No. 3,459,874 discloses the placement of busbars around a common bolt such that the busbars can be rotated. However, the housing at this point is essentially structurally complex and, furthermore, appears not to be suitable for high degrees of protection.

It is known, from U.S. Pat. Nos. 3,459,872 and 3,004,097, to have insulating plates with raised edges all around the busbar contour. This, however, does not form the housing. These documents also disclose the interdependent mobility of the insulating disks associated with the ends of the two connected busbars. However, the motion associated with that mobility is linear, and not rotary.

OBJECT OF THE INVENTION

The object of the invention is therefore to create a device, for the electrical connection of parallel busbars for busbar trunking systems, which makes it possible to easily change the direction of busbar trunking systems as desired.

The object of the invention is achieved by means of insulating disks, or cylindrical members, which can be rotated opposite to one another, which cylindrical members are placed between the busbars. The insulating cylindrical members are preferably so designed that they form a housing around the busbars, whereby the incoming and outgoing busbars are arranged in such a way that they can rotate like a hinge. Advantageous refinements of the invention are also disclosed hereinbelow.

Certain features of the invention disclosed hereinbelow result in the creation of a particularly favorable insulation, which is further improved by other features disclosed hereinbelow. For example, the gap between the insulating disks can be kept small enough that a high degree of protection is achieved. The number of required insulation plates can be reduced. An advantageous, favorable attachment of the rotatable insulation elements is created. The transition from the cylindrical housing to the busbar trunking or busbar housing is particularly well insulated. The simple electrical and mechanical connection of the busbars is improved. It is possible to use identical insulating plates. A particularly high degree of protection is achieved.

BRIEF DESCRIPTION OF THE DRAWINGS

The invention, additional configurations and refinements of the invention and additional advantages of the invention are described below with reference to the attached drawings of one embodiment, which may be summarized as follows.

DESCRIPTION OF THE PREFERRED EMBODIMENT

Figure 1:
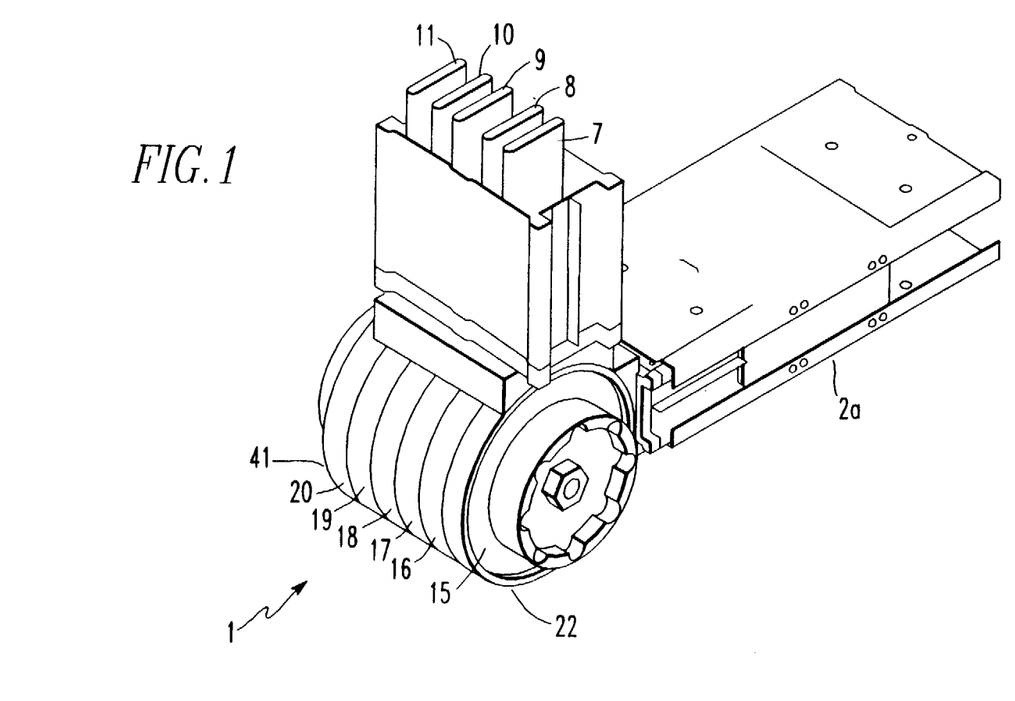
FIG. 1: A three-dimensional representation of the device according to the invention.

FIG. 1 shows the device according to the invention with a set angle of about 90°. The device consists of the incoming busbars, which are indicated in FIG. 1 by only the reference number 2a, and the outgoing busbars 7 to 11.

In essence, it does not matter which of the busbars is the incoming or outgoing busbar but the above-discussed orientation must be taken under consideration in this example for the purpose of illustration. It must also generally be assumed that the incoming busbars 2a are fixed, while the outgoing busbars 7 to 11 are mobile, although alternative arrangements of fixed and movable busbars are possible.

Figure 2:
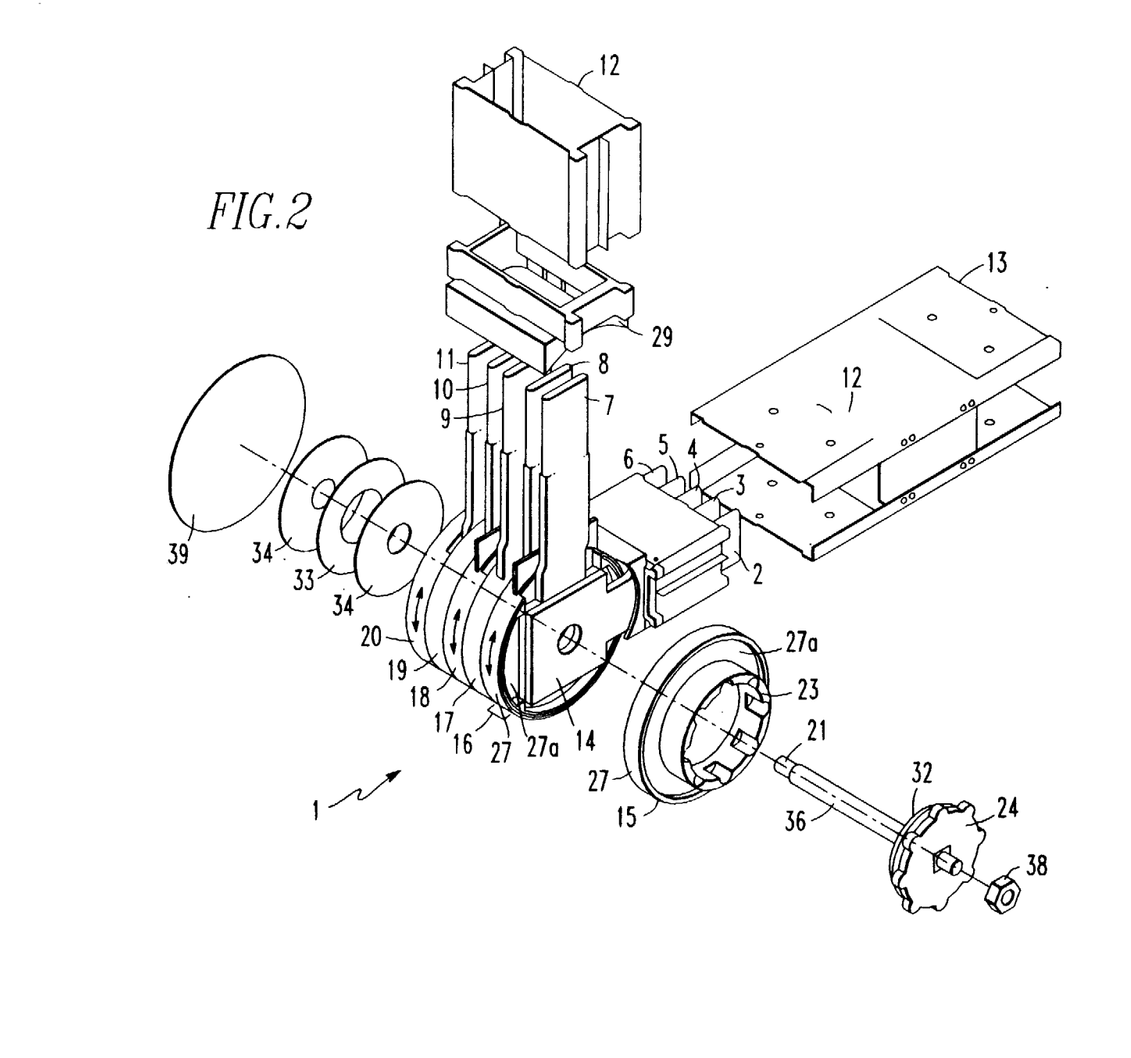
FIG. 2: An exploded representation of the device shown in FIG. 1.

As can be seen in FIG. 2 in particular, the housing 12 of busbars 2 to 6 preferably extends into the device 1. Busbars 2 to 6 can be electrically and mechanically connected to the busbar section 13 in a manner well-known to those of ordinary skill in the art.

Busbar 2 preferably terminates in an insulating disk 15, which is shown exploded, or taken-apart, in FIG. 2.

Busbar 2 preferably has, at a terminal portion thereof, as, preferably, do all of the other busbars of the device, a portion 14 having an expanded surface area. This enlarged portion 14 is preferably completely embedded in the insulating disk 15 and serves to essentially improve the contact of busbar 2 with its neighboring, interfacing busbar.

Busbar 2 corresponds to, or interfaces with, busbar 7, wherein busbar 7 is preferably placed in such a way that it can rotate with respect to busbar 2. Insulating disk 15, like busbar 2, is preferably not rotatable, while insulating disk 16, which corresponds to busbar 7, preferably follows the rotation of busbar 7. Both busbars 2 and 7, as well as both insulating disks 15 and 16, preferably can be rotated with respect to one another around a bolt 21 common to all busbars 2 to 11 and insulating disks 15 to 20.

Figure 4A:
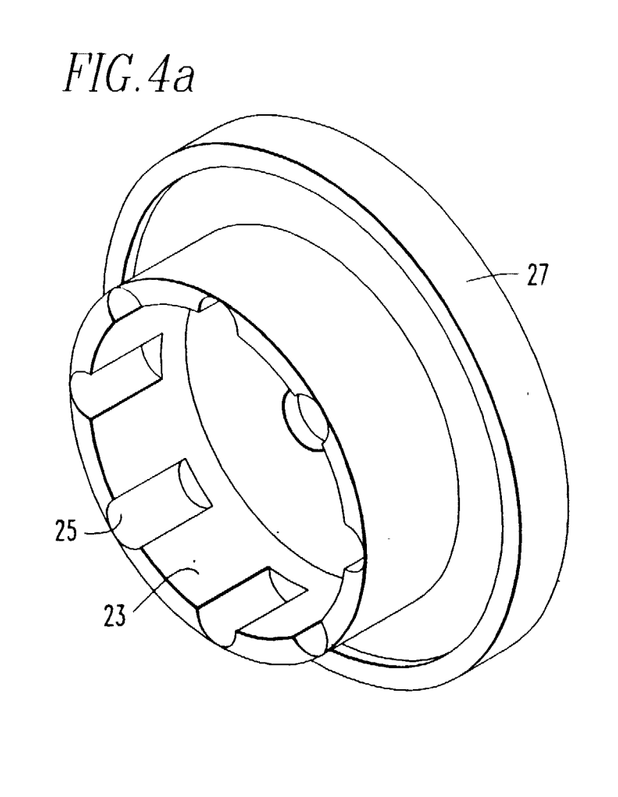
FIG. 4a: A three-dimensional representation of the insulating plate used as a terminating element.
Figure 7:
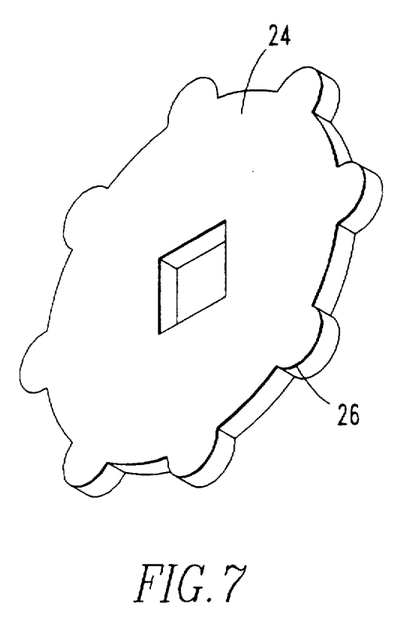
FIG. 7: A representation of the driver ring.

On the side of insulating disk 16 opposite to busbars 2 and 7, there is preferably an additional busbar 8 disposed in such a way that this inner insulating disk 16 preferably contains both busbars 7 and 8. Insulating disk 15 is preferably simultaneously the terminating element of the cylindrical joint 22, as can particularly be seen in FIG. 1. Disk 15 preferably has a seat 23 on the side opposite to busbar 2, which seat accepts a driver ring 24 in such a way that the driver ring 24 and seat 23 essentially cannot twist with respect to one another. This is preferably achieved by means of grooves 25 and projections 26, as can be seen in FIGS. 4a and 7.

The clamping function in the present invention will be described in more detail later. The insulating disk 17 adjacent to insulating disk 16 preferably corresponds to, or contains, busbars 3 and 4. As was assumed for purposes of illustration, this disk is preferably fixed, as are insulating disk 19 and busbars 5 and 6. Insulating disk 18, which corresponds to, or contains, busbars 9 and 10, is preferably rotatable, as is insulating disk 20, which preferably serves as a terminating section, whereby insulating disk 20 preferably corresponds to, or contains, busbar 11.

Insulating disks 15 to 20 preferably have raised regions 27 along the edges, as can be seen in FIGS. 4a, 4b, 5a and 5b, in such a way that when the insulating disks 15 to 20 are assembled together, the raised regions 27 essentially form a housing 41 in a simple manner.

Busbars 2 to 11 are preferably passed through openings 28 which are completely covered by insulating covers 29.

To avoid adversely affecting the contact of busbars 2 through 11, the insulating disks 15–20 are preferably sized in such a way that when put together, there is preferably a slight gap between them. The raised areas 27 have grooves 31 as seats for sealant, such that this gap may be sealed, to provide the device with a high degree of protection.

In addition to the driver ring 24, a spring washer 32 is also preferably placed in the seat 23, which spring washer, together with a spring washer 33 on the opposing end of the bolt and two plain washers 34, as particularly illustrated in FIG. 2, can preferably provide a pre-stress force, which pre-stress force is highly desirable. The bolt 21, as can particularly be seen in FIGS. 6a and 6b, preferably has a square enlargement of the cross-sectional area of the bolt 21, indicated at 35, for fitting into the driver ring 24 and a thread 37 on each end for fastening by means of nuts 38. Fastening can essentially thus be controlled by means of a defined pre-stress set at the factory on the cover 39 side in such a way that the customer only essentially has to tighten the nut 38 until reaching a stop. In addition, the bolt also preferably has an insulating conduit 36, which is shown in FIG. 2.

Figure 3A:
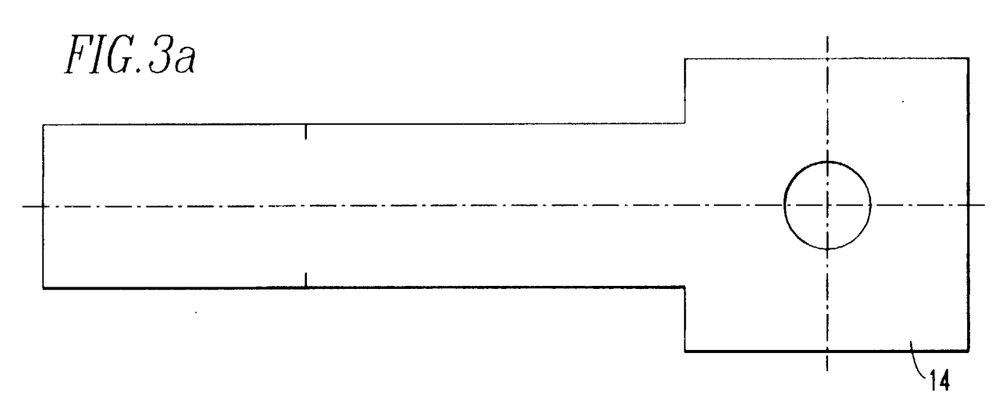
FIG. 3a: A top view of a busbar.
Figure 3B:
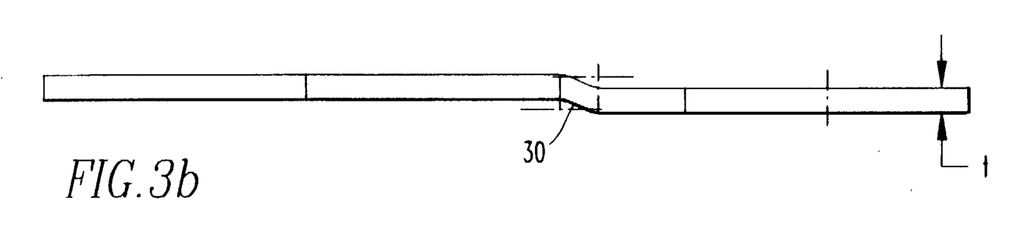
FIG. 3b: A side view of a busbar.
Figure 3C:
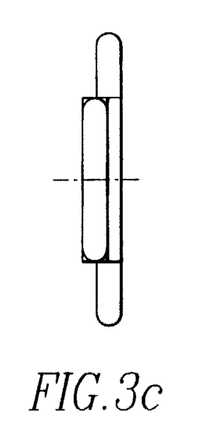
FIG. 3c: An additional side view of this busbar.

As can be seen in FIGS. 3b and 3c, there is also a preferably slight offset 30 to the busbars 2 to 11 which further ensures that a constant interval can preferably be maintained between busbars 2 through 11. The surface area enlargement 14 is preferably square and is preferably affixed to, or set firmly in, insulating disks 15 to 20 by means of the existing projections 40, which can be seen in FIG. 4b.

An additional possible embodiment, which is not illustrated here, would be to have the groove 31 completely encircle the circumference of cylindrical joint 22, whereby additional contact and insulating elements would possibly be required.

Preferably, the device can essentially be infinitely adjustable within a range of approximately 270°.

An adjustment scale can be provided to assist adjustment. Such a scale, for example, may be constituted by a set of markings about cylindrical joint 22, which markings could indicate a relative angular displacement between incoming busbars 2–6 and outgoing busbars 7–11.

The insulating covers 29 are preferably adapted to that of the housing of the busbar duct, and preferably include an area which is adapted to the cylindrical housing in such a way that an insulated transition is essentially created between both housings.

The disclosure now turns to a more detailed description of the components employed in a connection device according to the present invention.

FIG. 1 shows a connection device according to the present invention. Included in the device are a set of incoming busbars, indicated generally at 2a, and a set of outgoing busbars, indicated individually at 7 through 11. In FIG. 1, incoming busbars 2a are shown as being oriented at an angle of about 90° with respect to busbars 7 through 11.

It should be understood that the terms "incoming" and "outgoing", as applied herein, are intended primarily for differentiating between the two sets of busbars concerned, and are not to be taken as an absolute indication of the nature of each set of busbars. For example, it is conceivable to refer to busbars 2a as the "outgoing" busbars and busbars 7–11 as the "incoming" busbars. Also, for the purposes of illustration, busbars 2a can be thought of as being "fixed" and busbars 7 through 11 can be thought of as being "movable" although, indeed, both sets of busbars can essentially be thought of as both being movable with respect to each other.

In a manner to be described in greater detail below, a housing for busbar connections is indicated at 41. Additionally, the joint, preferably cylindrical, at which the incoming busbars 2a and the outgoing busbars 7–11 meet, is indicated in FIG. 1 at 22.

FIG. 2 more particularly illustrates the constituent components of a connection device according to the present invention and shows several of the components taken apart from the greater device. At this juncture, the busbars previously indicated at 2a can now be seen as individual busbars 2 through 6. It should be understood that, in a manner to be described more fully below, each of the incoming busbars 2-6 corresponds to, and in fact preferably interfaces with, one of the busbars 7–11.

As is typical in busbar connections, each set of busbars (2–6 and 7–11) preferably includes an outer housing 12, one for the incoming busbars 2–6 and one for the outgoing busbars 7–11. Thus, each housing 12 preferably surrounds its corresponding set of busbars (2–6 or 7–11) up to cylindrical joint 22. Indicated generally at 13 is a conventional busbar section to which, in a manner well-known to those of ordinary skill in the art, busbars 2–6 are preferably connected.

The busbars 2–6 and 7–11 all preferably meet at joint 22, which preferably includes a set of insulating disks 15–20. These insulating disks may be alternatively termed cylindrical members 15–20. Insulating disks 15–20 are all preferably stacked against one another to form a row of disks. In a manner described more fully below, each of these insulating disks 15–20 is preferably configured to accommodate therewithin a terminating portion 14 of at least one busbar.

In accordance with the present invention, a first incoming busbar 2 preferably terminates at a first insulating disk 15. Preferably, busbar 2, in a manner similar to preferably all other busbars in the connecting device, terminates at an enlarged portion 14 within its corresponding insulating disk, in this case disk 15. As shown, this enlarged portion is preferably in the form of a square-shaped portion 14. Preferably, disk 15 is configured such that enlarged portion 14 is essentially completely disposed within, or embedded in, disk 15. Enlarged portion 14 preferably has a hole in the center thereof to accommodate bolt 21.

Outgoing busbar 7 preferably terminates at disk 16, which itself is positioned adjacent disk 15. In accordance with the present invention, disk 16, positioned adjacent disk 15, is preferably rotatable with respect to disk 15. Likewise, busbar 7, extending from disk 16, is preferably angularly displaceable with respect to busbar 2. Similarly to busbar 2, busbar 7 preferably has an enlarged portion 14 within disk 16, which enlarged portion is preferably square-shaped and has a hole in a central portion therethrough. Accordingly, that hole is preferably configured to accommodate rod 21 therethrough, such that busbar 7 can essentially pivot, and disk 16 rotate, about bolt 21. It will be appreciated that disk 16 is preferably configured to accommodate busbar 7 in such a manner that disk 16 and busbar 7 will both undergo angular displacement in tandem. Such an observation can similarly be made with regard to busbar 2 and disk 15, if the two are indeed considered to themselves be angularly displaceable with respect to busbar 7 and disk 16.

At thus juncture, it serves to digress on the specific makeup of disk 15 and 16, as contemplated by the present invention. As has been stated heretofore, the enlarged portion 14 of busbar 2 preferably fits into disk 15 such that it is essentially disposed within, or "embedded" in, disk 15. With this in mind, it will be appreciated that disk 15 is preferably embodied by a circular, disk portion 27a and an outer wall portion 27, the outer wall portion 27 being essentially disposed about the circumference of the circular, disk portion 27a and, thus, being essentially cylindrical in nature. In this manner, it will be noted that the outer wall portion 27 of disk 15 preferably has a marked "height" dimension (indicated by "h" in FIG. 4b; that is, it extends from the circular disk portion in a direction perpendicular thereto, or parallel to a central longitudinal axis of bolt 21. By virtue of the height dimension of the outer wall portion, the enlarged portion 14 of busbar 2 can essentially, and preferably, be disposed within the outer wall portion 27 of disk 15 in such a manner that it may be considered to be embedded therewithin.

Disk 16 is preferably configured in a manner similar to that of disk 15, with one of the exceptions being that disk 16 is preferably configured to accommodate two busbars, in this case busbars 7 and 8. To this end, disk 16 also preferably comprises a central, circular disk portion 27a and an outer wall portion 27. In this case, however, the central disk portion preferably bisects disk 16 such that, preferably, approximately one-half of the outer wall portion 27 is, with respect to the axial direction of cylindrical joint 22, on one side of the circular disk portion 27a and approximately another half of the outer wall portion 27 is on the other side of the circular disk portion 27a. Thus, whereas disk 15 preferably includes essentially only one recess-type area for accommodating an enlarged portion 14 of a busbar, disk 16 preferably includes two such areas, wherein one such area is for accommodating enlarged portion 14 of busbar 7 and the other such area is for accommodating enlarged portion 14 of busbar 8. (Enlarged portions 14 of bus bars 7 and 8 are not shown in the drawings, but it should be understood that, preferably, they are disposed and configured in essentially the same manner as the enlarged portion 14 of busbar 2, which itself is shown in FIG. 2).

It will be appreciated that enlarged portions 14 of busbar 7 and busbar 8 are preferably insulated from one another by the central disk portion 27a of disk 16. It will further be appreciated that disk 15 and disk 16 are preferably configured such that, when placed adjacent one another, the outward facing portion of enlarged portion 14 of busbar 2 will essentially come into contact with the enlarged portion 14 of busbar 7 in order to afford an appropriate electrical contact connection between busbar 2 and busbar 7.

It will now be appreciated that the arrangement of interfacing busbars 2 and 7, as well as the configuration and relative positioning of disks 15 and 16, as described immediately above, preferably constitutes the basic principle on which the other disks (17–20) and busbars (3–6 and 8–11) are preferably arranged. Thus, disks 17–19 are preferably configured similarly to disk 16, such that:

disk 17 is preferably configured to hold enlarged end portions 14 of incoming busbars 3 and 4;

disk 18 is preferably configured to hold enlarged end portions 14 of outgoing busbars 9 and 10; and disk 19 is preferably configured to hold enlarged end portions 14 of incoming busbars 5 and 6, Additionally, disk 20 is preferably positioned at that end of cylindrical joint 22 opposite disk 15 and can preferably be configured similarly to disk 15, such that it is preferably configured to hold enlarged end portion 14 of disk 11.

It should now be understood that disks 15 and 20, which may be termed "end disks", are each preferably configured to hold enlarged end portions 14 of just one busbar each, whilst disks 16–19, which may be termed "intermediate disks", are each preferably configured to hold enlarged end portions 14 of two busbars each.

Accordingly, in a manner similar to that of busbars 2 and 7 already described, busbars 3–6 and 8–11 are preferably arranged among disks 16–20 such that:

outgoing busbar 8 preferably interfaces with incoming busbar 3, between disks 16 and 17;

outgoing busbar 9 preferably interfaces with incoming busbar 4, between disks 17 and 18;

outgoing busbar 10 preferably interfaces with incoming busbar 5, between disks 18 and 19; and outgoing busbar 11 preferably interfaces with incoming busbar 6, between disks 19 and 20.

Again, it should be understood that, similarly to disk 16, in each of intermediate disks 17–19, the two enlarged end portions 14 of the corresponding busbars are insulated from one another by the central disk portion of the disk in question.

It will be appreciated that disk 15 preferably serves both to hold enlarged end portion 14 of busbar 2 and to cap one end of cylindrical joint 22. In the sense of the latter, disk 15 is preferably configured, as shown in FIG. 2 to include a seat 23. Seat 23 is preferably constituted by a generally cylindrical wall coaxial with respect to the outer wall portion of disk 15, yet having a smaller radius. Preferably disposed along the inward-facing surface of the cylindrical wall constituting seat 23 are a set of preferably semi-cylindrical indentations 25, wherein each of the indentations 25 can preferably be distributed uniformly about the circumference of seat 23. As an example, eight such indentations 25 may be provided.

As will be appreciated from FIG. 2, the bolt 21, which preferably serves as a focus for angular displacement of disks 15–20 and busbars 2–11, and which is preferably disposed through the centers of disks 15–20, preferably is configured to carry thereupon, at the end thereof adjacent disk 15, a driver ring 24. As shown, driver ring 24 is preferably constituted by a general disk shape, yet preferably includes a plurality of projections 26. Each of the projections 26 is preferably configured to be snugly accommodated in a corresponding one of the indentations 25 of seat 23. Thus, there is preferably a number and relative distribution of projections 26 corresponding to the number and relative distribution of indentations 25. In this manner, seat 23 is essentially configured to accommodate driver ring 24 in such a way that the two will not be angularly displaceable with respect to one another. It should be understood that, although the arrangement of projections 26 and indentations 25 is described herein as a preferable means for achieving this end, other possible arrangements may be used within the scope of the present invention. For example, a force-locking or friction-locking arrangement could possibly be employed.

It will now be appreciated that, when disks 15–20 are aligned with one another in a row, as illustrated in FIGS. 1 and 2, the outer wall portions of each disk will collectively serve to essentially create, along the axial direction of cylindrical joint 22, a housing 41 for the busbar connections. In other words, the outer wall portions 27 of disks 15–20 are preferably configured such that they combine to effectively form a housing for the enlarged end portions 14 of the busbars 2–11. In addition, as has been mentioned heretofore, each of the busbars 2–11 is preferably passed through openings 28 to cylindrical joint 22 wherein, however, each of the openings is preferably covered completely, or is essentially sealed, by insulating covers 29.

As has been mentioned heretofore, preferably, the disks 15–20 are preferably dimensioned such that, when the disks are aligned adjacent one another, there may preferably be a slight gap therebetween.

Figure 5A:
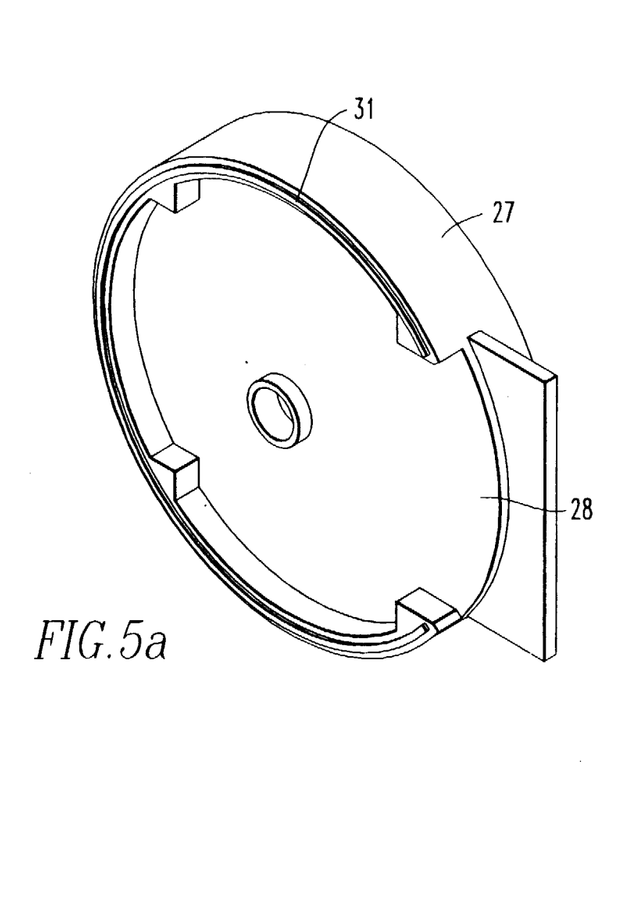
FIG. 5a: A three-dimensional representation of a middle insulating plate.
Figure 5B:
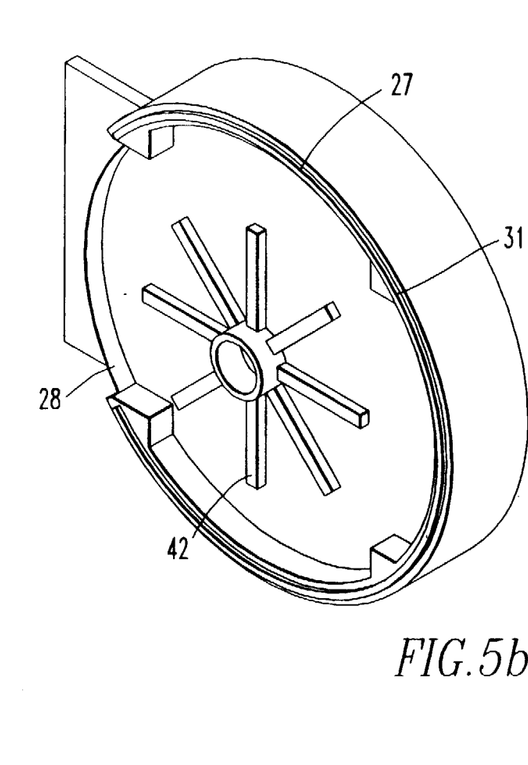
FIG. 5b: An additional three-dimensional representation of this insulating plate.

Particularly, the height (h) of the outer wall portion 27 in question can preferably be less than a thickness (t) of the enlarged end portion 14 of the corresponding busbar or, as shown in FIG. 5b, there may preferably be an arrangement of ribs, or webs, 42 on the surface of circular disk portion 27a so that enlarged end portion 14 may be held in such a way that enlarged end portion 14 can extend beyond the height (h) of outer wall portion 27. It should be understood that, in the case of intermediate disks 16–20 the height (h) should preferably be taken to represent essentially about one-half of the linear dimension of those disks in the axial direction thereof, or, put another way, the distance from circular disk portion 27a to either edge of outer wall portion 27.

Primarily, this may be done so as to avoid adversely affecting the contact of the busbars with each other. Preferably, disposed within each outer wall portion of each disk 15–20, on each of the sides which face another, adjacent disk, is a groove 31. As may be even more clearly seen in FIG. 5b, each such groove preferably has a slight depth in the axial direction of joint 22 and is preferably cut into the outer face surface of the outer wall portion, that is, into that end surface which is perpendicular to the longitudinal axis of joint 22. Groove 31 preferably extends in a circumferential direction and terminates at either side of opening 28. In order to seal the gap between disks mentioned above, each groove 31 can preferably serve as a seat, or recipient, for sealant.

Modifications on the basic principles outlined immediately heretofore can be made within the scope of the present invention, as long as neighboring disks, and their associated busbars, are arranged such that contact between enlarged end portions 14 of the busbars in question is afforded.

The disclosure now turns again to FIGS. 3a–7, which more clearly illustrate the preferred specific features of various components employed by the present invention.

As shown in FIGS. 3a to 3c, each busbar preferably includes a slight offset 30 when progressing from one end to the other thereof. The offset is preferably configured such that a constant interval can preferably be maintained between adjacent pairs of busbars.

Figure 4B:
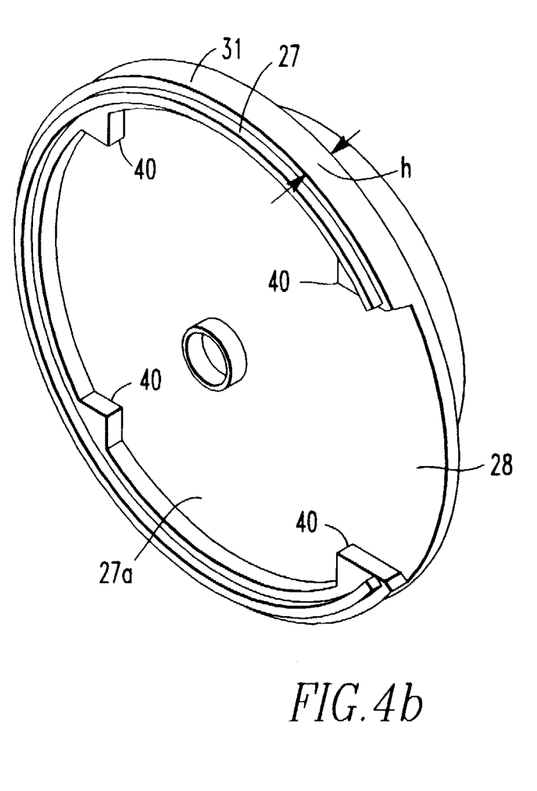
FIG. 4b: An additional three-dimensional representation of this insulating plate.

FIGS. 4a and 4b show opposing views of an insulating disk, such as disk 15, which may be used as a terminating disk. It will be noted that opening 28 is preferably provided in outer wall portion 27 to accommodate a busbar. It will also be noted that a set of projections 40 are preferably provided to firmly hold the enlarged portion 14 of the busbar in question in such a manner that the bus bar essentially cannot rotate within the disk in question, but essentially will rotate along with the disk. Particularly, the projections 40 are preferably configured as minor bumps distributed essentially uniformly about the inner periphery of outer wall portion 27, and are preferably four in number. Of course, it is possible, within the scope of the present invention, to utilize other possible arrangements for firmly holding an enlarged end portion 14 of a busbar within a disk.

FIGS. 5a and 5b show opposing three-dimensional views of an insulating disk, such as any of disks 16–19, which may preferably be used as an intermediate disk.

Figure 6A:
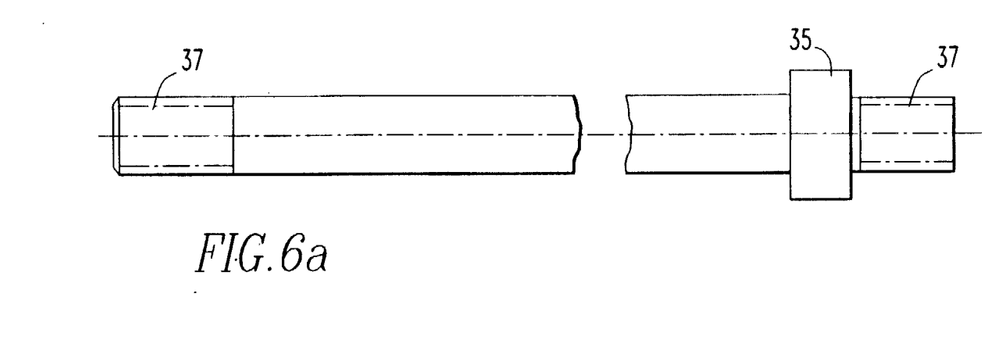
FIG. 6a: A side view of the bolt.
Figure 6B:
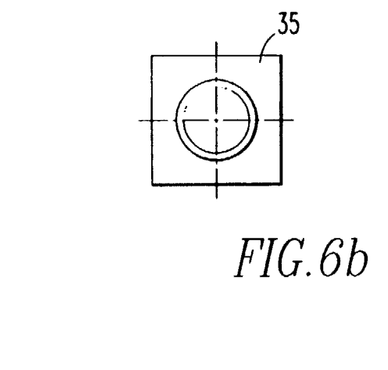
FIG. 6b: A top view of the bolt.

FIGS. 6a and 6b show different views of bolt 21.

Finally, FIG. 7 shows a more detailed view of driver ring 24, particularly with its projections 26 and its preferably square center opening for accommodating therewithin the square portion 35 of bolt 21. In this manner, rotation of bolt 21 with respect to driver ring 24 can be prevented.

It should now be appreciated that, within the scope of the present invention, modifications can be made on the basic principles set forth hereinabove. For example, insofar as joint 22 has been referred to heretofore as a "cylindrical joint", it should be understood that it may be possible, within the scope of the present invention to provide a joint which is not necessarily generally cylindrical in shape. Likewise, it is conceivable to use a number of disks and busbars different from that contemplated hereinabove. Many such departures from the preferred embodiments disclosed hereinabove can be made while still remaining within the spirit and scope of the invention.

One feature of the invention resides broadly in the device for the electrical connection of parallel busbars for busbar trunking systems with a common tensioning element in the form of a bolt, in which device the busbars are arranged at the junction site in such a way that they rotate around the common tensioning element, characterized by the fact that insulating disks 15 to 20 which can be rotated opposite to one another are placed between the busbars 2 to 11, which insulating disks are so designed that they form a housing 41 around the busbars 2 to 11, whereby the incoming and outgoing busbars 2 to 11 are placed in such a way that they can rotate like a hinge.

Another feature of the invention resides broadly in the device, characterized by the fact that for each incoming busbar 2, 3, 4, 5, 6, there is an insulating disk 15, 17, 19, and that there is an additional insulating disk 16, 18, 20 which can be rotated opposite to the incoming busbar 2, 3, 4, 5, 6 and the corresponding insulating disk 15, 17, 19.

Still another feature of the invention resides broadly in the device, characterized by the fact that the insulating disks 15 to 20 have raised edges and form a cylindrical housing 41 when put together, and that the insulating disks 15 to 20 have an opening 28 for the passage of the busbars 2 to 11.

Yet another feature of the invention resides broadly in the device, characterized by the fact that the inner insulating disks 16, 17, 18, 19 are designed as common insulating disks 16, 17, 18, 19 for two busbars 3 to 10, whereby one side of these insulating disks 16, 17, 18, 19 is assigned to one busbar 7, 8, 3, 4, 9, 10, 5, 6.

Another feature of the invention resides broadly in the device, characterized by the fact that an insulating disk 15, which is used as a terminating element, has a seat 23 for a driver ring 24, which is embedded in this seat in such a way that it cannot twist and is firmly attached to the bolt 21.

Still another feature of the invention resides broadly in the device, characterized by the fact that in those areas in which the busbars 2 to 11 pass out of the cylindrical housing 40, there are insulating covers 29 which create an insulated transition from the busbars 2 to 11 to the busbar duct.

Yet still another feature of the invention resides broadly in the device, characterized by the fact that the busbars 2 to 11 have a surface area enlargement 14.

Another feature of the invention resides broadly in the device, characterized by the fact that the surface area enlargement 14 is square.

Still yet another feature of the invention resides broadly in the device, characterized by the fact that the busbars 2 to 11 are alternately offset in the area extending passing out from the housing 41.

Yet another feature of the invention resides broadly in the device, characterized by the fact that the insulating disks 15 to 20 have a groove 31 for sealant.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for electrically connecting parallel busbars in a busbar trunking system, the busbar trunking system including a common tensioning element, the common tensioning element comprising a bolt, wherein, at a junction of one set of the busbars with another set of the busbars, the busbars are rotatable about the common tensioning element, said apparatus comprising:

a plurality of insulating members, each of said insulating members having a generally cylindrical shape;

each of said plurality of insulating members being rotatable relative to each adjacent insulating member;

at least a portion of each of said insulating members being disposed between two busbars;

said insulating members being configured to form a housing about a portion of each of the busbars;

the busbars being disposed for undergoing hinge-like angular displacement;

wherein:

the plurality of busbars comprises a set of incoming busbars and a set of outgoing busbars;

said plurality of insulating members comprises a first set of members and a second set of members;

each of said incoming busbars corresponds to one of said first set of insulating members;

each of said second set of insulating members is configured for undergoing relative angular displacement with respect to said first set of insulating members and said set of incoming busbars;

each of said insulating members comprises a raised edge portion;

said insulating members comprising insulating disks;

said raised edge portion of said insulating members being configured to combine to form a cylindrical housing when said insulating disks are disposed adjacent one another;

each of said insulating disks comprising an opening for affording the passage therethrough of each of said busbars.

2. The apparatus according to claim 3, wherein:

said plurality of insulating members comprising a first end member, a second end member, and a plurality of intermediate members disposed between said first end member and said second end member;

each of said intermediate disks being configured to accommodate two of said busbars;

each of said intermediate disks having first and second opposite portions, on opposite sides of said intermediate disk; and each of said opposite portions of said intermediate disk being configured to accommodate one of said busbars.

3. The apparatus according to claim 2, further comprising:

a driver ring being mounted on said bolt at one end thereof; and said first end member comprising a seat for accommodating said driver ring, said driver ring for being accommodated in said seat such that said driver ring is rotationally fixed with respect to said seat.

4. The apparatus according to claim 3, wherein said busbars are configured for connecting with busbar ducts away from said insulating members, said apparatus further comprising:

a plurality of insulating covers; and said plurality of insulating covers being configured for covering a portion of said busbars adjacent said insulating members, such that an insulated transition is provided between said busbar ducts and said insulating members.

5. The apparatus according to claim 4, wherein each of said busbars comprises an enlarged surface area portion.

6. The apparatus according to claim 5, wherein each said enlarged surface area portion is square.

7. The apparatus according to claim 6, wherein:

each said busbar comprises an upper portion and a lower portion, a major portion of the lower portion for being disposed within said insulating members;

said lower portion being parallel to said upper portion and offset, in an axial direction of said insulating members, with respect to said upper portion; and said lower portion of each said busbar being offset in a direction opposite that of said lower portion of an adjacent busbar.

8. The apparatus according to claim 7, wherein:

each of said insulating members comprises groove means; and each of said groove means is configured for accommodating sealant to seal gaps between adjacent ones of said insulating members.

* * * * *

UNITED STATES PATENT AND TRADEMARK OFFICE
CERTIFICATE OF CORRECTION

PATENT NO. : 5,322,444
DATED : June 21, 1994
INVENTOR(S) : Karsten AUDEHM and Eckhard AMMANN It is certified that error appears in the above-indentified patent and that said Letters Patent is hereby corrected as shown below:

In column 10, line 66, Claim 2, after 'claim' delete "3" and insert --1--.

Signed and Sealed this

Eighth Day of October, 1996

BRUCE LEHMAN

Attest:

*Attesting Officer*       *Commissioner of Patents and Trademarks*